Figure 1:
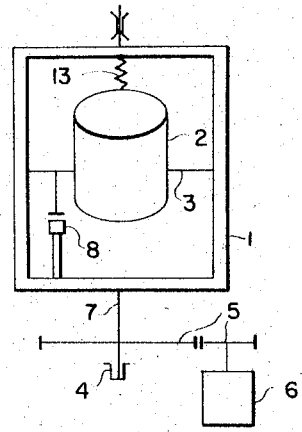

March 7, 1967 CARL-ERIK GRANQVIST 3,307,412
NORTH-SEEKING GYRO SYSTEM
Filed Feb. 25, 1963 4 Sheets-Sheet 1

INVENTOR
CARL-ERIK GRANQVIST

BY Larson and Taylor
ATTORNEYS

March 7, 1967  CARL-ERIK GRANQVIST  3,307,412
NORTH-SEEKING GYRO SYSTEM
Filed Feb. 25, 1963  4 Sheets-Sheet 2

INVENTOR
CARL-ERIK GRANQVIST

BY Larson and Taylor
ATTORNEYS

United States Patent Office 3,307,412
Patented Mar. 7, 1967

3,307,412
NORTH-SEEKING GYRO SYSTEM
Carl-Erik Granqvist, Lidingo, Sweden, assignor to AGA
Aktiebolag, a corporation of Sweden
Filed Feb. 25, 1963, Ser. No. 260,818
Claims priority, application Sweden, Mar. 2, 1962,
2,299/62
7 Claims. (Cl. 74—5.6)

The invention refers to an arrangement for determining the north direction with the aid of a gyro system comprising a gyro wheel rotating in the gyro housing which is rotatably mounted in a gimbal. The invention utilizes the movements performed by the gyro housing owing to the earth's rotation when the gimbal rotates at nearly constant speed. According to an essential characteristic of the invention, the gyro housing is therefore rotatably mounted in a gimbal rotating at approximately constant speed and provided with pickup members for generating a signal in dependence on the position of the gyro housing relative to the gimbal, the signal being compared with a reference signal for determining the north direction.

The invention will be described below with reference to the drawing, in which FIGS. 1, 2, 6, 7, 9 and 10 are different embodiments of the invention and FIGS. 3–5 and 8 are diagrams illustrating the principle.

The principle of the invention will be explained first with reference to FIGS. 1 and 2, which show a gimbal in two mutually perpendicular positions of its rotation. 1 designates the gimbal which has mounted rotatably on an axle 3 therein a gyro housing 2. The housing 2 is assumed to comprise in a known manner a gyro wheel, which is not shown in the drawing, the wheel being assumed to rotate at constant speed. The gimbal 1 is mounted in the bearings 4 and is coupled to a motor 6 by means of a gearing 5 imparting to the gimbal 1 an approximately constant speed of rotation on the axle 7. The precession torque acting on the gyro housing 2 due to the rotation of the gimbal 1 is counteracted by a spring 13, which is mounted between the gimbal 1 and the gyro housing 2. As a result thereof the gyro housing assumes a position of balance, equilibrium, in which the axis of rotation 12 of the gyro wheel forms an angle $\alpha$ with the axis of rotation 7 of the gimbal 1. A pickup device 8 is provided for indicating the position of the gyro housing 2 relative to the gimbal 1 and comprises one portion integral with the gimbal 1 and another portion integral with the gyro housing 2. The pickup device may comprise an E-core, the outer legs of which carry windings to which is fed a constant A.C. voltage, such as 400 cycles/sec., and the middle leg of which carries a third winding connected to a suitable indicator. The core cooperates with an armature which may perform a movement near the core, thereby to set up a magnetic coupling between the middle leg and either of the outer legs. The amplitude and phase of the voltage induced in the middle leg then depends on the momentary position of the anchor relative to the E-core. In FIG. 3, the vector 9 represents the rotation of the earth. The components of this vector in the vertical and the horizontal direction in a given point P on the surface of the earth are represented by the vectors 10 and 11, respectively, the latter being oriented in the north-south direction. Thus, the component of the earth's rotation in the east-west horizontal direction is zero. In north-seeking systems it is usually this circumstance that is made use of, however it is also possible to have the system seek the maximum of the horizontal component, which is in the north-south direction. In the following, it will be assumed that the FIG. 1 system is shown in a position in which the torque exerted on the gyro housing 2 owing to the earth's rotation is at a maximum, and that in FIG. 2 the position is perpendicular to that of FIG. 1, corresponding to the value 0 for the torque.

Using the designations $\omega$ for the angular speed of the gimbal 1, $I_0$ for the moment of inertia of the gyro wheel, $\omega_0$ for the angular velocity of the gyro wheel and $\alpha$ as defined above we obtain the following expression for the torque exerted about the axis 3 owing to the rotation of the gimbal:

$$\omega \cdot I_0 \cdot \omega_0 \cdot \sin \alpha \qquad (1)$$

If the earth's rotation is designated $\omega_j$, the value of the torque at the position shown in FIG. 1, in which the torque created by the rotation of the earth is assumed to be a maximum, is found to be $$\omega \cdot I_0 \cdot \omega_0 \cdot \cos \alpha \qquad (2)$$

Figure 2:
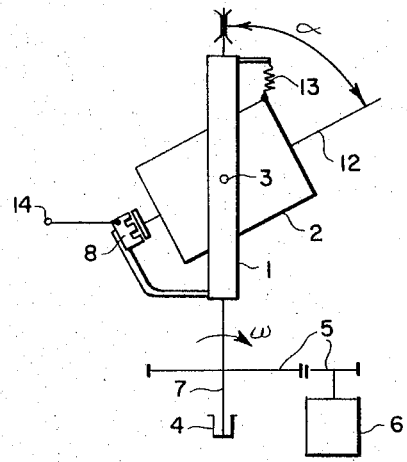
Figure 3:
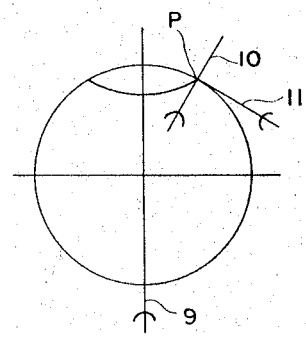

When the gimbal has rotated to the position shown in FIG. 2, the torque from the earth's rotation is 0, as mentioned above, and it follows that the torque set up by the earth's rotation may be written $$\omega_0 \cdot \omega_j \cdot I_0 \cdot \cos \alpha \cdot \cos \beta_t \qquad (3)$$

where $\beta_t$ is the angle between the gimbal and a fixed direction in the horizontal plane.

The above-mentioned torques on the gyro housing are balanced by a spring 13, which is mounted between the gimbal 1 and the gyro housing 2. Assuming that the spring 13 has the spring constant $k$, the following equation of equilibrium is obtained for the arrangement.

$$\omega \cdot \sin \alpha + \omega_j \cdot \cos \alpha \cdot \cos \beta_t = \frac{k}{I_0 \cdot \omega_0} \cdot \alpha \qquad (4)$$

Neglecting, to begin with, the influence of the earth's rotation, which is equivalent to saying that $\omega_j = 0$, it is assumed that the angle between the axles 7 and 12 is $\alpha_0$. In this case, the equation of equilibrium becomes $$\omega \cdot \sin \alpha_0 = \frac{k}{I_0 \cdot \omega_0} \cdot \alpha_0 \qquad (5)$$

If the earth's rotation is not neglected, that is $\omega_j \neq 0$, it is assumed that the angle between the axles is $\alpha_0(1+\Delta)$. If this value of $\alpha$ is inserted in Equation 4, the equation of equilibrium assumes the following form $$\omega \, (\sin \alpha_0 \cdot \cos \Delta\alpha_0 + \sin \Delta\alpha_0 \cdot \cos \alpha_0)$$
$$+ \omega_j \cdot \cos \beta_t \, (\cos \alpha_0 \cdot \cos \Delta\alpha_0$$
$$- \sin \alpha_0 \cdot \sin \Delta\alpha_0) = \frac{k}{I_0 \cdot \omega_0}(\alpha_0 + \Delta\alpha_0) \qquad (6)$$

The oscillations that are performed by the gyro housing under the influence of the earth's rotation are small, which implies that $\Delta\alpha_0$ is small. Therefore, $\cos \Delta\alpha_0 = 1$ and $\sin \Delta\alpha_0 = \Delta\alpha_0$. Furthermore, $\sin \alpha_0 \cdot \sin \Delta\alpha_0$ is negligible in comparison with $\cos \alpha_0 \cdot \cos \Delta\alpha_0$. With these simplifications, the Equation 6 can be rewritten as $$\omega \cdot \Delta\alpha_0 \cdot \cos \alpha_0 + \omega_j \cdot \cos \beta_t \cdot \cos \alpha_0 = \frac{k}{I_0 \cdot \omega_0} \cdot \Delta\alpha_0 \qquad (7)$$

If this equation is solved for $\Delta\alpha_0$, we obtain $$\Delta\alpha_0 = -\frac{\omega_j \cdot \cos \beta_t \cdot \cos \alpha_0}{\omega \cdot \cos \alpha_0 - \frac{k}{I_0 \cdot \omega_0}} = -\frac{\omega_j}{\omega} \cdot \frac{\cos \beta_t}{1 - \frac{\tan \alpha^0}{\alpha_0}} \qquad (8)$$

To determine the angular movement $\Delta\alpha_0$, which is to be expected from the gyro housing under the influence of the earth's rotation, it may be assumed that $\omega_j = 0, 1°$ per minute and that the gimbal 1 rotates at the angular velocity 180° per minute. Furthermore, we may assume $$1 - \frac{\tan \alpha_0}{\alpha_0} = 0.1$$

If these values are inserted in Equation 8, we obtain $$\Delta\alpha_0 = \frac{1}{180} \cdot \cos \beta_t$$

In this equation $\alpha_0$ is in radians, which means that the gyro housing under the influence of the earth's rotation performs an oscillation with a maximum amplitude of $\frac{1}{3}°$. The pickup device 8 can be constructed with a resolution of the output voltage which is of the order of $10^4$, which means that the accuracy of the course indication will be about $\frac{1}{10}°$. This accuracy may be increased for instance by selecting $\alpha_0$ so that $$1 - \frac{\tan \alpha_0}{\alpha_0}$$

approximates to 0. It is furthermore clear from Equation 8 that the sensitivity of the arrangement is higher if a lower value is selected for the angular velocity $\omega$.

With regard to FIGURES 1 and 2 it was assumed that the gimbal 1 rotates about a vertical axis 7. It is however possible to let the gimbal rotate about a horizontal axis, the arrangement being then adapted to seek for the minimum of a horizontal component which is in the east-west direction.

Figure 4:
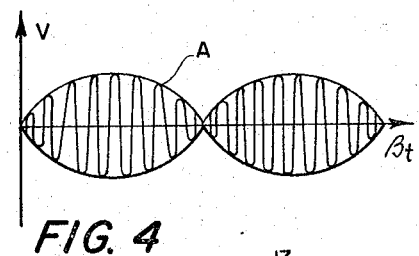
Figure 5:
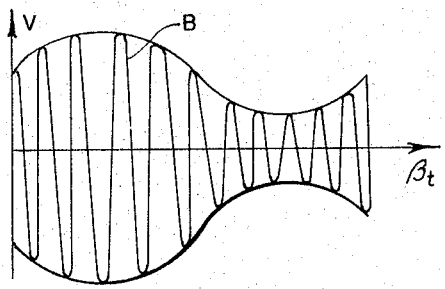
Figure 6:
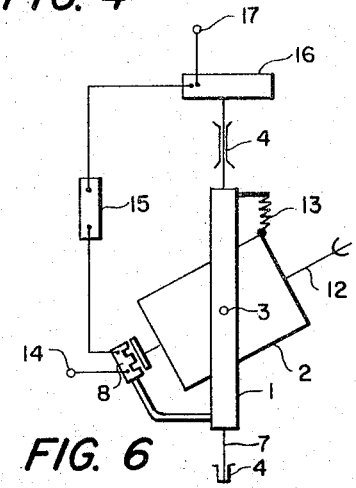

If the pickup device 8 is of the inductive type, as described, the output voltage V obtained from the middle leg winding as a function of the angle $\beta_t$ will have the form shown by curve A in FIG. 4, according to which the voltage V is zero at values of $\beta_t$ corresponding to the angle of 0° and 180° between the gimbal $1^t$ and said fixed direction in the horizontal plane. This is seen to be a modulated carrier wave. If the angular velocity $\omega$ of the rotation of the gimbal 1 is selected so as to make $$\omega \cdot \sin \alpha_0 = \frac{k \cdot \alpha_0}{I_0 \cdot \omega_0}$$

the output signal of the pickup device has no constant component, i.e. the armature of the pickup device 8 oscillates symmetrically with respect to the equilibrium, zero, position. However, if the angular velocity is larger or smaller than this value of $\omega$, the armature of the pickup device 8 does not oscillate symmetrically with respect to said equilibrium position and the output signal will have an appearance according to curve B in FIG. 5. It is apparent that this signal has a constant component caused by the deviation from the zero position. For the purpose of indicating the earth's rotation it is however desirable to have a signal comprising only the component due to this rotation, and the constant component should therefore be suppressed. This may be achieved by making the constant component control the frequency of an oscillator and letting the oscillator drive the motor for causing the rotation of the gimbal. In this way it is possible to diminish the constant component of the output voltage. An embodiment of this type is shown in FIG. 6, in which the same reference numbers are used for details corresponding to FIGS. 1 and 2. As in these figures a carrier wave, such as 400 cycles/sec., is applied to the pickup device 8 via a terminal 14. The output voltage of the pickup device 8 is applied via an amplifier 15 to a torquer 16 connected with the axle 7. To this torquer there is also applied via a terminal 17 an oscillation of the same frequency as the carrier but in phase quadrature thereto. The result of this is that the gimbal 1 rotates at a speed very close to $\omega$ if the arrangement is not influenced by the earth's rotation. Any deviation from the $\alpha_0$ depends on the amplification in the amplifier 15, the deviation tending to the value zero as the amplification approaches infinity. Considering the complete expression for the torque according to Equation 4, i.e.

$$\omega \cdot \sin \alpha + \omega_j \cdot \cos \alpha \cdot \cos \beta_t = \frac{k \cdot \alpha}{I_0 \cdot \omega_0}$$

and the above considerations it is apparent that if the amplification in the servo loop comprising the amplifier 15 becomes infinite, then $\alpha = \alpha_0$ This implies that $$\omega \cdot \sin \alpha_0 + \omega_j \cdot \cos \alpha_0 \cdot \cos \beta_t = \frac{k}{I_0 \cdot \omega_0} \cdot \alpha_0 \quad (9)$$

From this equation, an expression for the angular velocity can be derived:

$$\omega = \frac{\frac{k}{I_0 \cdot \omega_0} \cdot \alpha_0 - \omega_j \cdot \cos \alpha_0 \cdot \cos \beta_t}{\sin \alpha_0} \quad (10)$$

Using $\omega'$ for the average value of $\omega$, we obtain with the aid of Equation 5

$$\omega = \frac{\omega' \cdot \sin \alpha_0 - \omega_j \cdot \cos \alpha_0 \cdot \cos \beta_t}{\sin \alpha_0} \quad (11)$$

From this equation we obtain the ratio of $\omega$ to $\omega'$:

$$\frac{\omega}{\omega'} = 1 - \frac{\omega_j}{\omega} \cdot \frac{1}{\tan \alpha_0} \cdot \cos \beta_t \quad (12)$$

Inserting in this equation $\omega_j = 0.1°$ per minute and $\omega = 180°$ per minute and $\tan \alpha_0 = 3$ we obtain the value $\frac{1}{5400}$ for the variable term of the equation. It is apparent from this that the angular frequency $\omega$ varies very little, even if the amplification of the servo loop is nearly infinite. In practice, however, a smaller degree of amplification is chosen to obtain a voltage indicating the earth's rotation. Through a suitable compromise a satisfactory value of this voltage can be obtained at the same time as the angular frequency $\omega$ is held very nearly constant.

To determine the phase of the modulated oscillation obtained from the pickup device 8 a reference for the angle of rotation $\beta$ is required. One way of obtaining this is to apply a portion of the output voltage of the pickup device to a sine-cosine resolver, in which a multiplication with a sine and a cosine oscillation takes place, yielding quadratic terms which are of equal magnitude if there are symmetrical phase conditions.

Figure 7:
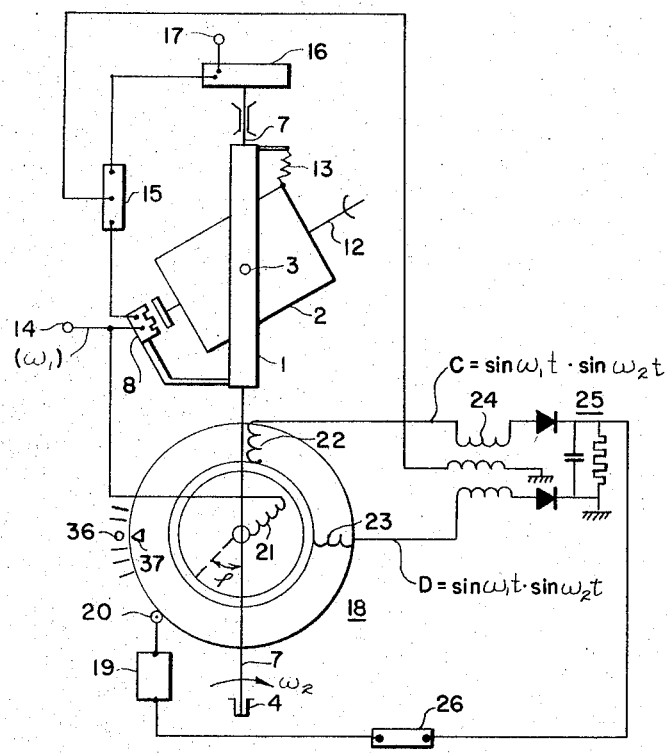
Figure 8:
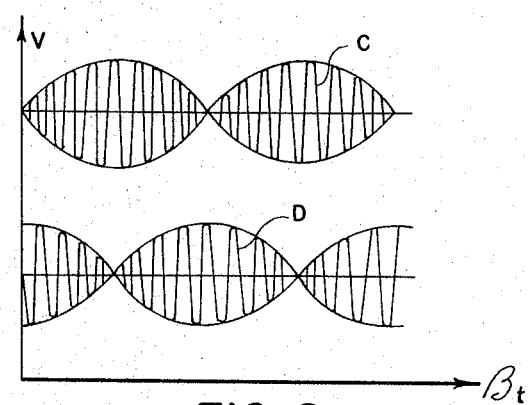

Another embodiment is shown in FIG. 7, according to which the oscillation applied to the pickup device 8, the frequency of which was assumed to be 400 cycles/sec., is applied to a sine-cosine resolver 18, the rotor of which is connected to the gimbal 1 so as to rotate with the latter, and the stator of which can be rotated by a motor 19 by way of a coupling 20. The carrier wave is applied to a winding 21 on the rotor and the stator has a pair of mutually perpendicular windings 22 and 23, in which oscillations in phase quadrature are induced in a well-known manner. The oscillations thus obtained will be of the form illustrated by curves C and D in FIG. 8 which show the amplitudes of the two oscillations as a function of the angle of rotation $\beta_t$ of the gimbal 1, this rotation being the same as that of the rotor of the sine-cosine resolver 18. These oscillations are applied each to a winding of a transformer 24, which has a third winding, to which is applied the output voltage from the pickup device 8 via the amplifier 15. There is furthermore connected to the transformer 24 a phase detector 25 of well-known construction comprising a pair of rectifiers and an output circuit comprising the parallel arrangement of a capacitor and a load resistor. One end of the load resistor is grounded and at the other end there is obtained a control voltage, which is applied to the motor 19 by way of an amplifier 26 to rotate the stator of the sine-cosine resolver 18. The arrangement is selected so as to make the output control voltage of the phase detector 25 be zero when the modulation phase of the output voltage of the pickup device 8 is in the middle between the phases of the reference voltages obtained from the windings 22 and 23.

The amplified voltage at the output of the amplifier 15 may be written as $$\sin \omega_1 t \cdot \cos \omega_2 t \text{ and } \sin \omega_1 t \cdot \sin \omega_2 t$$

and furthermore as is apparent from the above, the voltages induced in the windings 22 and 23 are $$\sin \omega_1 t \cdot \cos \omega_2 t \text{ and } \sin \omega_1 t \cdot \sin \varpi_2 t$$

where $\omega_1$ is the angular frequency of the carrier wave applied to terminal 14, $\omega_2$ the angular velocity of rotation of the gimbal 1, $a$ a constant and $\phi$ the angle between the winding 21 in the sine-cosine resolver and one of the winding 22 and 23. When $\phi$ is 45°, these voltages are equal.

Figure 9:
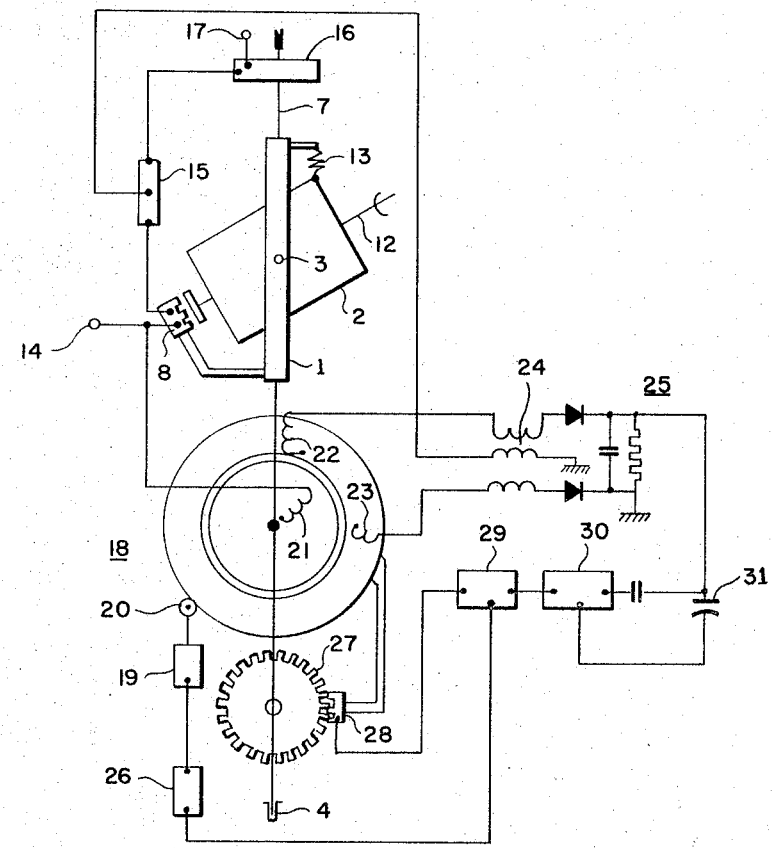

In the arrangement according to FIG. 7, the gimbal 1 rotates very accurately with the angular velocity $\omega$, and this makes it advantageous to use the arrangement as a directional gyro. A further embodiment of this type is shown in FIG. 9 according to which there is mounted on the axle 7 a toothed wheel 27 cooperating with a pickup device 28 of the same type as the device 8. The pickup device 28 is integral with the rotatable stator of the sine-cosine resolver 18 and its output signal is applied to the input of a frequency detector 29 provided with a second input circuit, to which is applied the output signal of an oscillator 30. This oscillator is of variable frequency, which is controlled by means of a variable capacitor 31, the capacitance of which depends on the applied voltage, in the present case of the control voltage obtained from the phase detector 25. The output voltage of the phase detector 29 drives the motor 19 via the amplifier 26 and controls the position of the stator of the sine-cosine resolver 18 so as to equalize the phase of the output oscillation of the pickup device 28 with that of the oscillator 30. If then the north direction should not coincide with the direction of the sine-cosine resolver, a control voltage is obtained from the phase detector 25 and changes the frequency of the oscillator 30. This in turn causes the motor 19 to rotate the stator of the sine-cosine resolver until the control voltage obtained from the phase detector 25 is zero.

By a suitable choice of variable capacitor 31 and possibly of the D.C. amplification factor, the time constant for the frequency change of the oscillator 30 can be made arbitrarily short. If a long time constant is used, accidental deviations of the axle 7 from a predetermined direction such as the vertical will be of no influence. The oscillator frequency can be made to vary with a high degree of accuracy by using a crystal-controlled oscillator and counting technique. It is also possible to use the arrangement merely as a directional gyro when large deviations from the vertical position occur. To this end, it is only necessary to interrupt the D.C. connection to the phase detector. When the arrangement is put into operation, it may be of advantage to use initially a strong input on the variable capacitor 31 so as to obtain swifter adjustment.

Figure 10:
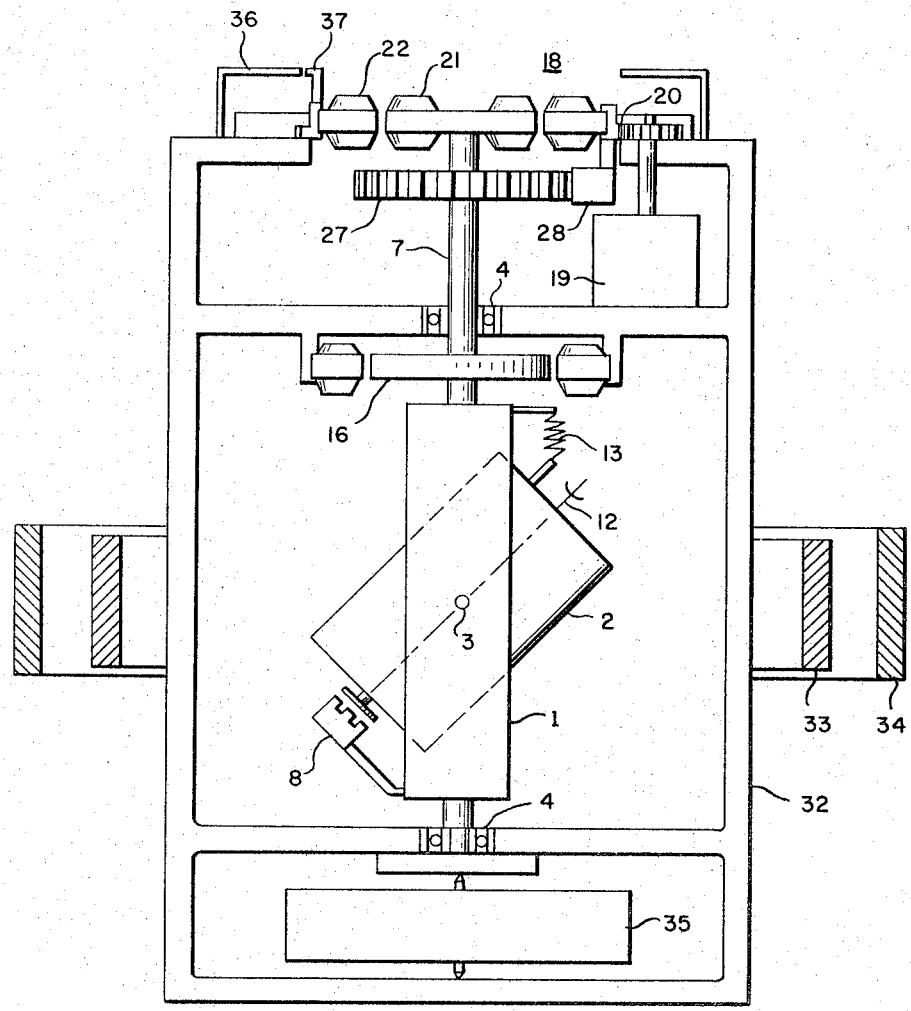

When the arrangement is used on a vehicle, means must be provided for holding it in a fixed position relative to the vertical. This can be done in a conventional manner by mounting the arrangement in a gimbal system which is pendulum controlled so as to maintain the fixed position relative to the vertical. In order to provide a smoothing action with regard to rapid variations and to provide a differentiating function, it may be suitable to provide a further rotating mass. An embodiment of this type is shown in FIG. 10. As in the foregoing figures, 1 is the gimbal with the gyro housing 2. The axle 7 is rotatably mounted in bearings 4. The gyro housing 2 has mounted therein a gyro wheel which rotates on an axle 12. The housing 2 is under the influence of a spring 13 and a pickup device 8 is adapted to indicate the position thereof relative to the gimbal 1. The latter is adapted to be rotated, as previously shown, by the torquer 16 and furthermore, there is mounted on the axle 7 the toothed wheel 27 of and the rotor of the sine-cosine resolver 18 with its winding 21. The stator of the sine-cosine resolver 18 with the winding 22 is adapted for rotation by the motor 19 via the coupling 20. These members are carried by a frame 32, which is mounted in a gimbal system comprising an inner gimbal ring 33 and an outer gimbal ring 34. Further mounted in the frame 32 is a rotating mass 35, serving to stabilize the frame 32. Owing to its low placement within the frame 32, the mass 35 can also serve as a pendulum for controlling the frame 32, thereby to make the axle 7 normally coincide with the vertical direction.

As indicated in FIG. 10 and also schematically indicated in FIG. 7, the frame 32 has a graduated scale 36 cooperating with an index pointer 37 integral with the stator of the sine-cosine resolver 18. As is apparent from the foregoing disclosure, this provides an indication of the course of vehicle on which the arrangement is mounted relative to the north direction.

What I claim is:

1. A north-seeking gyro arrangement comprising a gimbal, a gyro housing being rotatably mounted in a gimbal, a gyro wheel rotatable in said housing, means for rotating said gimbal at substantially constant speed, a pickup device having one member connected with the gimbal and another member connected with the gyro housing, said pickup member generating a signal indicative of the position of the gyro housing relative to the gimbal, means for applying said signal to said gimbal rotating means for controlling the speed of rotation of the gimbal, means for generating a reference signal indicative of the momentary position of the gimbal with reference to a fixed direction, and means for comparing said first-named pickup signal with said second-named position indicating signal thereby to determine the north direction.

2. An arrangement as claimed in claim 1 and further comprising a spring having one end connected with the gyro housing and the other end connected with the gimbal, said spring counter-acting the tendency of rotation of the gyro housing owing to the precession caused by the rotation of the gimbal.

3. An arrangement as claimed in claim 1 in which the means for generating the reference signal comprises a sine-cosine resolver having at least a rotor winding, said rotor winding being connected with the gimbal for rotating in synchronism with said gimbal, and further comprising means for applying an alternating current voltage to said rotor winding.

4. An arrangement as claimed in claim 1 and further comprising a pulse-generating means having a rotatable member connected for rotation with the gimbal and a pickup device cooperating with said wheel for generating a pulse sequence having a frequency corresponding to the speed of rotation of the gimbal, a phase detector and an oscillator, means for applying said pulse frequence as well as the output of said oscillator to said phase detector, means for controlling the frequency of said oscillator, and means for applying the output of the phase detector to said means for controlling the frequency of the oscillator.

5. An arrangement as claimed in claim 4 comprising a motor connected with the stator of said sine-cosine resolver, means for applying the output voltage of said phase detector to said motor thereby to indicate the north direction.

6. An arrangement as claimed in claim 1 and further comprising pendulum controlling means for maintaining the gimbal in a fixed position relative to the vertical.

7. An arrangement as claimed in claim 1 and further comprising an additional rotating mass, said mass being connected with the gimbal for damping the movements thereof.

References Cited by the Examiner

UNITED STATES PATENTS 2,552,132  5/1951  Anderson _____ 74—5.46
2,981,113  4/1961  Erdley _____ 74—5 X FRED C. MATTERN, JR., *Primary Examiner.*

BROUGHTON G. DURHAM, *Examiner.*

P. W. SULLIVAN, J. D. PUFFER, *Assistant Examiners.*